Aug. 11, 1925.
B. E. KIEST
1,548,888
HARVESTING MACHINE
Filed April 2, 1921   3 Sheets-Sheet 3
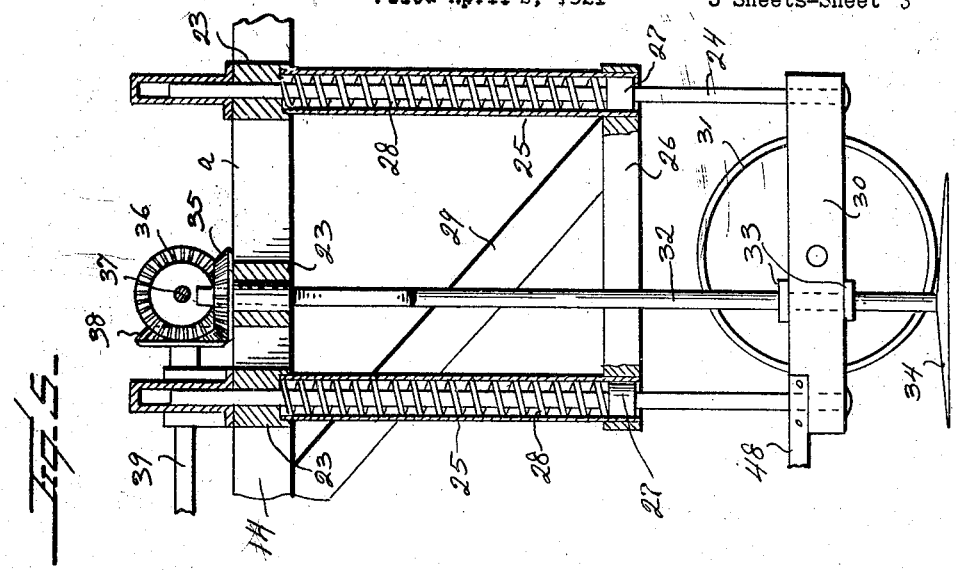
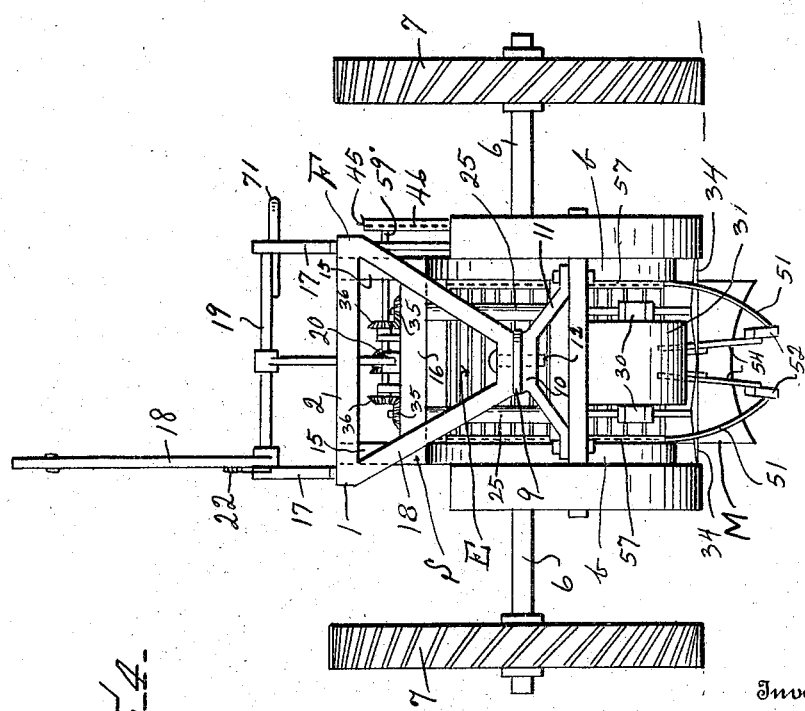
Inventor
B. E. Kiest
By Watson E. Coleman
Attorney Patented Aug. 11, 1925.

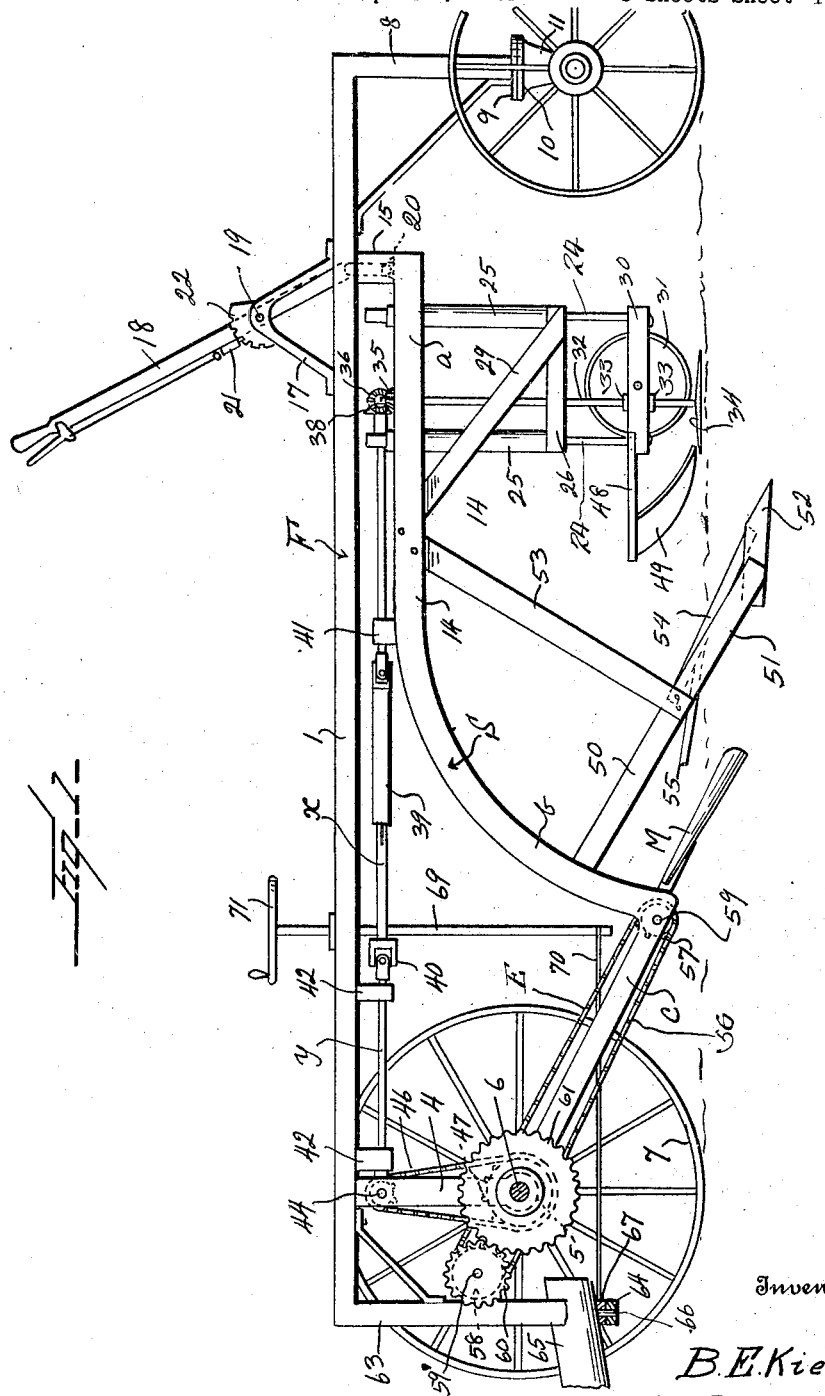

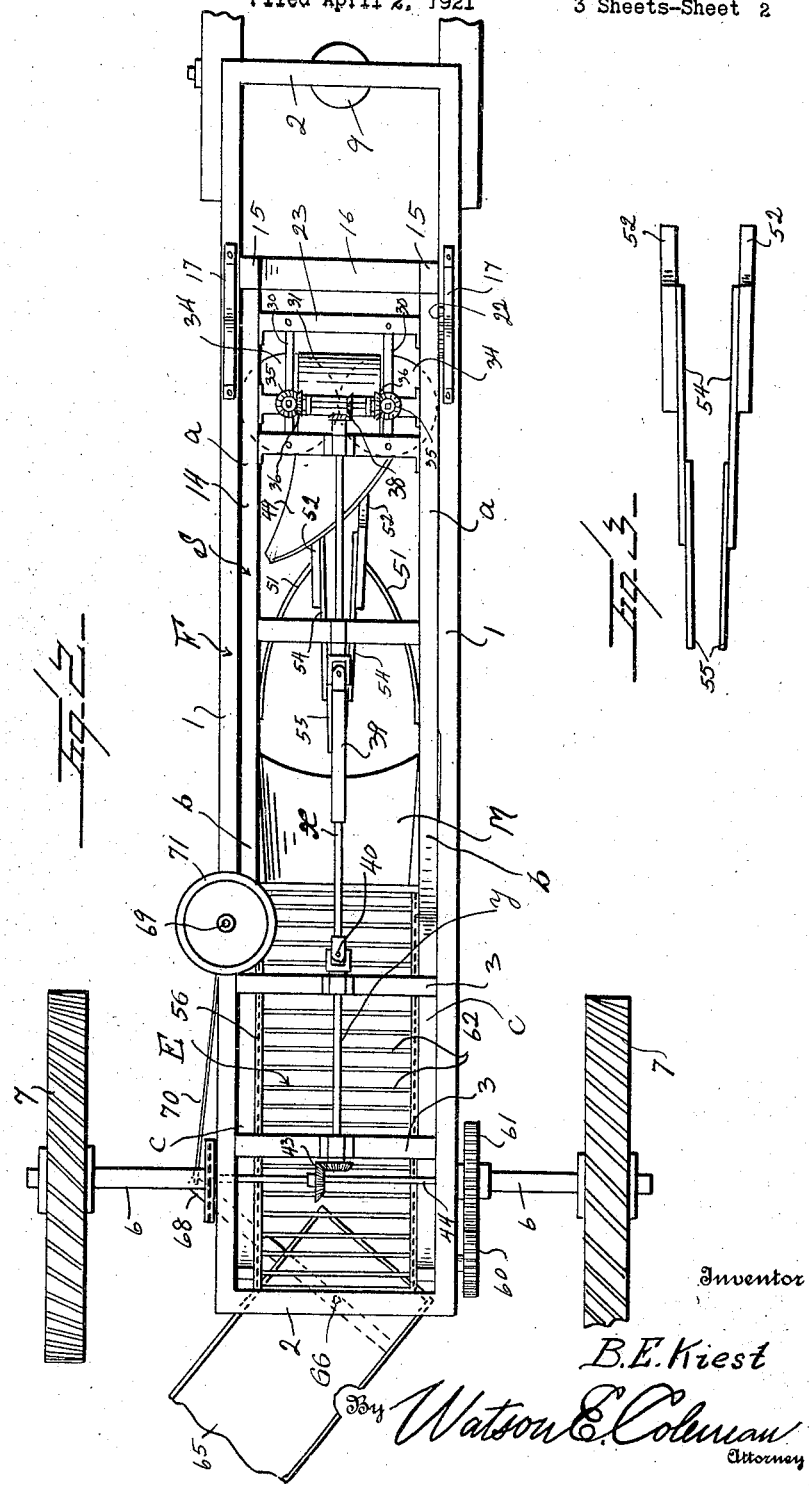

1,548,888

UNITED STATES PATENT OFFICE.

BERT ERNEST KIEST, OF LARAMIE, WYOMING, ASSIGNOR, BY DIRECT AND MESNE ASSIGNMENTS, OF TWO-THIRDS TO WILLIAM A. ANDERSON, OF LARAMIE, WYOMING.

HARVESTING MACHINE.

Application filed April 2, 1921. Serial No. 457,950.

*To all whom it may concern:*

Be it known that I, BERT ERNEST KIEST, a citizen of the United States, residing at Laramie, in the county of Albany and State of Wyoming, have invented certain new and useful Improvements in Harvesting Machines, of which the following is a specification, reference being had to the accompanying drawings.

This invention relates to certain improvements in harvesting machines and has relation more particularly to a device of this general character especially designed and adapted for use in the harvesting of sugar beets, and it is an object of the invention to provide a machine of this general type having novel and improved means whereby the plants may be readily and effectively topped and whereby the severed tops are deflected to one side or out of the path of travel of the machine.

Another object of the invention is to provide a novel and improved machine of this general character embodying a topping mechanism, together with ground working members positioned rearwardly thereof and at opposite sides of a plant row for loosening the beet or kindred root so that the same may be readily raised from the ground by a lifting element arranged rearwardly of the ground working elements.

An additional object of the invention is to provide a novel and improved machine of this general character embodying a mechanism whereby the beets or kindred roots may have the tops severed therefrom before the beets or the like are lifted from the ground and wherein an elevating mechanism is positioned to receive the beets as lifted from the ground and which elevating mechanism delivers to an adjustable chute or apron whereby the beets may be discharged upon the ground to one side of the machine and also whereby the beets from a plurality of rows may be discharged along a single windrow.

Furthermore, it is an object of the invention to provide a novel and improved device of this general character embodying a wheel supported frame, together with a vertically adjustable secondary frame, said secondary frame being provided with a topping mechanism, a lifting mechanism and an elevator mechanism.

The invention consists in the details of construction and in the combination and arrangement of the several parts of my improved harvesting machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a harvesting machine constructed in accordance with an embodiment of my invention;

Figure 2 is a view in top plan of the device as illustrated in Figure 1;

Figure 3 is a fragmentary view in top plan of the ground working members and the lifting rods coacting therewith;

Figure 4 is a view in front elevation of the device as herein set forth; and

Figure 5 is an enlarged transverse vertical sectional view taken through the forward portion of the machine as herein disclosed, and illustrating in detail the means for yieldably supporting the topping mechanism.

As disclosed in the accompanying drawings, F denotes the main frame of my improved harvester, said frame being elongated and preferably oblong in form and comprising the side beams 1, the end beams 2 and the intermediate connecting or reinforcing beams 3 spaced apart longitudinally of the frame. The side beams 1 adjacent their rear ends are provided with the transversely spaced pillars or standards 4. The lower end portions of the pillars or standards 4 are provided with the bearings 5 which rotatably support the rear axle 6, the opposite end portions of the axle 6 having mounted thereon the rear supporting or traction wheels 7.

The forward end portion of the frame F is provided with the depending pillars or standards 8 converging downwardly and provided at their lower extremities with a fifth wheel member 9 coacting with a fifth wheel member 10 carried by a front supporting truck 11, said fifth wheel members 9 and 10 having associated therewith in a well known manner a king bolt 12. My improved machine is particularly adapted to be drawn by draft animals and the same are to be hitched in any desired manner with the forward portion of the machine and particularly with the front supporting truck 11.

S denotes a supplemental frame including the connected elongated side members 14. Each of the side members 14 has a substantially straight forward portion $a$ provided at its front end with an upstanding and vertically directed extension 15 and with a cross member 16. The rear part of the forward straight portion $a$ is continued by a downwardly curved or arcuate portion $b$, the low point of said portion $b$ being positioned, when the frame F is applied, a desired distance in advance of the rear axle 6. Each of the side members is continued from the rear or low extremity of the curved portion $b$ by an upwardly inclined straight portion $c$, the rear or free end portion of which is loosely mounted upon the axle 6, whereby the frame S in its entirety is supported for vertical swinging movement. The rear or free extremities of the portion $c$ of each of the side members 14 extends a slight distance rearwardly of the axle 6.

The supplemental frame S is of a width less than the width of the frame F so that the upstanding extensions 15 overlie the inner faces of the side beams 1 and in close proximity thereto, whereby the frame S is held against undue lateral movement relative to the frame F. Supported by the frame F above the forward end portion of the frame S is an upstanding bracket 17 which pivotally supports a lever 18. The lower end portion of the lever 18 extends below the pivotal connection 19 and is operatively engaged, as at 20, with the cross or connecting member 16 whereby, upon requisite movement of the lever, the frame S may be vertically swung or adjusted as the occasions of practice may require. In order that the frame may be held in its various vertical adjustments, the lever 18 is provided with a conventional type of latch mechanism 21 which coacts in a well known manner with a rack 22 carried by the bracket 17.

The portions $a$ of the side members 14 of the frame S are connected by the cross members 23 herein shown as three in number and the outer members have slidably disposed therethrough the vertically directed rods 24. These rods 24 also extend through the tubular members 25 depending from the outer cross members 23, the lower end portions of said members being connected by the bracing strips 26. A portion of the rod within each of the tubular members 25 is provided with an enlargement or head 27 and engaging said head is an expansible member 28 arranged within the tubular member and which expansible member 28 is herein disclosed as a coil spring encircling the rod. By this means, each of the rods 24 is constantly urged downwardly and permitted to have upward yielding movement. In order that the structure afforded by the tubular members 25 and the coacting bracing strips 26 may be rigid to withstand the strain imposed thereupon when the machine is in operation, I provide the reinforcing members 29 interposed between the portions $a$ of the side members 14 and the side connecting or bracing strips 26.

Secured to the lower portions of the rods 24 are the transversely spaced and longitudinally directed beams or bolsters 30 which rotatably support therebetween a roller 31. Disposed through each of the beams or bolsters 30 rearwardly of the axial center of the roller 31 is an upstanding shaft 32, the upper end portion of which is slidably disposed through the intermediate cross member 23. Said shaft 32 has fixed thereto above and below the coacting beam or bolster 30 the collars 33 whereby said shaft is effectively held against undue endwise movement with respect to said beam or bolster yet permitted to freely rotate.

The lower end portions of the shafts 32 have fixed thereto the horizontally disposed cutting discs 34. The cutting discs 34 extend below the roller 31 but in close proximity thereto with the bight of said discs positioned slightly rearwardly of the axis of the roller 31.

Keyed to the upper end portions of the shafts 32 for rotation therewith but permitting said shafts to have free endwise movement are the bevel gears 35 arranged above the intermediate cross member 23. These bevel gears mesh with the bevel gears 36 carried by a shaft 37 mounted upon the intermediate cross member 23 and extending lengthwise thereof. The central portion of the shaft 37 is operatively engaged through the instrumentality of the intermeshing bevel gears 38 with the forward end portion of the longitudinally directed drive shaft 39.

The shaft 39 includes two sections $x$ and $y$ having their opposed end portions operatively connected by a universal joint 40 of a conventional type. The section $x$ of the shaft 39 is rotatably supported by the bearings 41 carried by the supplemental frame S while the second section $y$ of the shaft 39 is rotatably supported by the bearings 42 carried by the rear portion of the main frame F. The rear or outer end portion of the section $y$ of the shaft 39 is in driven connection through the medium of the intermeshing gears 43 with a transversely disposed shaft 44 carried by the frame F and at a point substantially directly above the axle 6. One end portion of the shaft 44 is provided with a sprocket wheel 45 around which passes a chain 46, said chain also passing around a sprocket 47 fixed to the axle 6, said sprocket 47 being of a radius greater than that of the sprocket 45 so that the shaft 44 will be caused to rotate at a relatively high speed upon the advance of the machine.

In practice, the machine straddles a row of plants and the roller 31 rides over the tops of the beets while the rotating cutting discs 34 effectively sever such tops.

Extending rearwardly from the beams or bolsters 30 are the arms 48 which operatively support a transversely disposed deflecting plate or member 49, said plate or member being arcuate in cross section and gradually increasing in width from one side toward the other with the forward and lower marginal portion of said plate partially overlying and in close proximity to the cutting discs 34. This plate 49 receives the severed tops and as the machine advances operates to throw said severed tops to one side of the path of travel of the machine or more particularly to one side of the plant row being operated upon so that said severed tops will offer no hindrance or obstruction to the succeeding operations of the mechanisms arranged rearwardly of the cutting discs 34.

Extending downwardly and forwardly from the lower parts of the curved portions $b$ of the side members 14 of the supplemental frame S are the substantially parallel arms 50. The arms 50 are continued by the inwardly curved extensions 51 to the lower or free extremities of which are affixed the ground working members or shoes 52. These members or shoes 52, in practice, are positioned at opposite sides of a plant row so that as the machine advances the earth or soil is effectively cut so that the beets or the like within the ground may be readily lifted by the member M to be hereinafter more particularly referred to. The lower portion of each of the arms 50 has coacting therewith a brace member 53 also secured to the rear part of the straight portion $a$ of the adjacent side member 14 of the frame F whereby the arms 50 are maintained in a rigid position with respect to the frame S. Extending upwardly and rearwardly from the members or shoes 52 are the lifter rods 54 and extending rearwardly from the upper portions of the rods 54 are the additional lifter rods 55.

The member M hereinbefore referred to is of a scoop shape and is disposed forwardly and downwardly from the inner or lower extremities of the rear straight portions $c$ of the side members 14 of the frame F, and the member M penetrates the ground in the path of the row whereby the beets are lifted. Said beets, together with the loosened soil, pass upwardly of the member M and also over the rods 54 and 55, said rods 55 discharging upon the member M. As the machine advances, the lifted beets or the like pass upwardly of the apron to the elevator mechanism E.

The elevator mechanism E includes the endless side chains 56 passing around the lower sprockets 57 and the upper sprockets 58 with the stretches of each of the chains disposed above and below the axle 6. The lower sprockets 57 are carried by the shaft 59 connecting the lower extremities of the portions $c$ of the side members 14 of the frame F while the upper sprockets 58 are mounted upon the shaft 59' connecting the upper extremities of said portions $c$. One end portion of the shaft 59' has fixed thereto a gear 60 meshing with a larger gear 61 fixed to the axle 6 so that as the machine advances, the upper shaft 59' will be rotated in a direction to assure the proper travel of the side chains 56. The chains 56 are connected by the transversely disposed bars or cleats 62 whereby the lifted beets are properly held by the elevating mechanism and carried upwardly.

The rear end portions of the side beams 1 of the frame F have depending therefrom the posts or columns 63, the lower extremities of said posts or columns being connected by the cross member 64. 65 denotes an elongated discharge chute having the central part of one end portion pivotally engaged, as at 66, with the central part of the cross or connecting member 64. The pivot pin 66 is disposed through a transversely directed cleat or strip 67 secured to the under surface of the chute 65 and extending a predetermined distance to one side of the chute to provide an arm 68 whereby swinging movement may be imparted to the chute as required. The chute 65 is adapted to be inclined rearwardly and laterally so that the beets or the like delivered upon the chute from the elevator mechanism E may be discharged to one side of the path of travel of the machine and by varying or adjusting the lateral inclination of this chute 65, the beets harvested from a plurality of adjacent rows may be discharged in a single windrow.

Swinging movement to the chute 65 in one direction, in the present embodiment of my invention, is accomplished upon requisite rotation of the vertically disposed post 69 supported for rotary movement by the frame F. The lower end portion of the rod or post 69 and the outer end portion of the arm 68 are connected by the flexible member 70 which, upon rotation of the post 69 in one direction, is wound upon said post whereby swinging movement is imparted in one direction to the chute 65.

The upper end portion of the post 69 is provided with a hand wheel 71 whereby said post 69 may be readily and conveniently rotated as desired.

From the foregoing description it is thought to be obvious that a harvesting machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described including a main frame, front and rear wheels and axles supporting said frame, a supplemental frame pivotally mounted upon the rear axle and extending forwardly therefrom, means on the main frame for supporting and vertically adjusting the front end of the supplemental frame, vertically disposed shafts carried by the front end portion of the supplemental frame, cutting disks mounted upon the lower end portions of said shafts, a driving shaft extending longitudinally of the machine and comprising a section journaled upon the forward end portion of the supplemental frame, a section journaled upon the rear end portion of the main frame, and universal couplings connecting the sections, operative connections between the vertically disposed shafts and the front end of said driving shaft, and operative connections between the rear axle and the rear end of the driving shaft.

2. In a beet harvester, a main frame supported for travel, a supplemental frame supported by the main frame for vertical swinging movement, means for adjusting said supplemental frame, vertically movable bolsters suspended from the supplemental frame, yieldable means normally holding the bolsters lowered, vertically disposed shafts rotatably mounted in the bolsters and movable vertically therewith, topping disks carried by the lower ends of said shafts, means on the main frame and the supplemental frame for rotating said shafts and disks, and a roller mounted in the bolsters to ride over the tops of the beets to be topped and influence automatic vertical adjustment of the bolsters and the topping disks carried thereby.

3. In a beet harvester, a frame supported for travel, a second frame supported thereby for vertical movement, means yieldably resisting upward movement of the second-mentioned frame, a roller mounted in the second-mentioned frame and movable therewith and adapted to ride over the beets to be topped and harvested, topping disks rotatably mounted in the second-mentioned frame and movable therewith and operating at the rear of and in fixed proximity to the engaging side of the roller, means for rotating the disks, and a deflector of arcuate cross section fixed upon the second-mentioned frame and gradually increasing in width toward one side, the lower front marginal portion of the deflector overlying the topping disks whereby the tops removed by said disks will all be delivered at one side of the harvester.

In testimony whereof I hereunto affix my signature.

BERT ERNEST KIEST.